W. C. WARFIELD.
WEEDER AND CULTIVATOR.
APPLICATION FILED SEPT. 19, 1907.

900,137.

Patented Oct. 6, 1908.

Witnesses

Inventor
William C. Warfield
By Victor J. Evans
Attorney

UNITED STATES PATENT OFFICE.

WILLIAM C. WARFIELD, OF EMINENCE, KANSAS.

WEEDER AND CULTIVATOR.

No. 900,137. Specification of Letters Patent. Patented Oct. 6, 1908.

Application filed September 19, 1907. Serial No. 393,638.

*To all whom it may concern:*

Be it known that I, WILLIAM C. WARFIELD, a native-born citizen of the United States, residing at Eminence, in the county of Finney and State of Kansas, have invented new and useful Improvements in Weeders and Cultivators, of which the following is a specification.

This invention relates to weeders and cultivators and one of the principal objects of the same is to provide a weeder mounted upon runners and having oppositely extending cutters mounted upon curved levers and provided with means whereby said cutters may be raised or lowered for cutting weeds or stalks at any required distance or height from the ground.

Another object of the invention is to provide a weeder mounted upon runners and provided with means for adjusting the runners toward and from each other.

These and other objects may be attained by means of the construction illustrated in the accompanying drawing, in which:—

Figure 1:
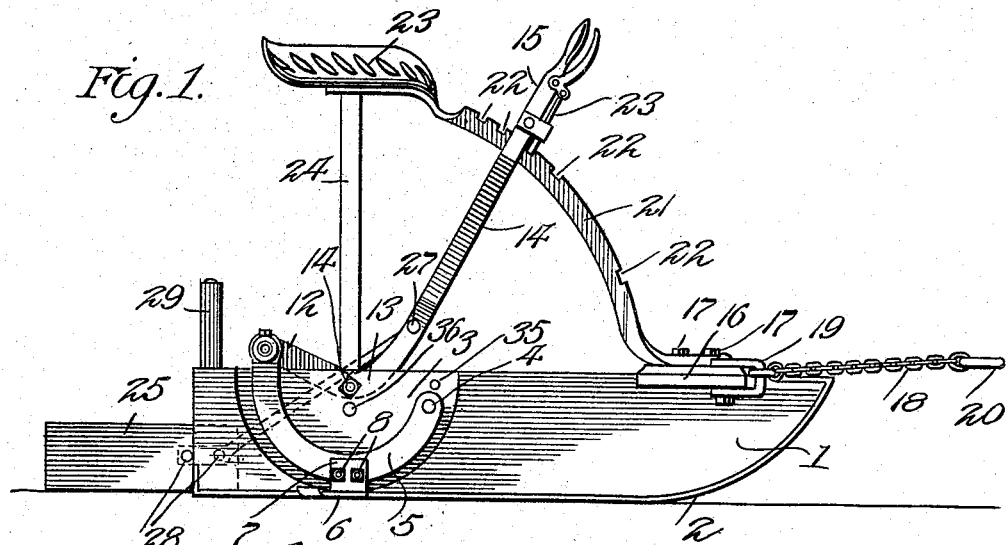
Figure 2:
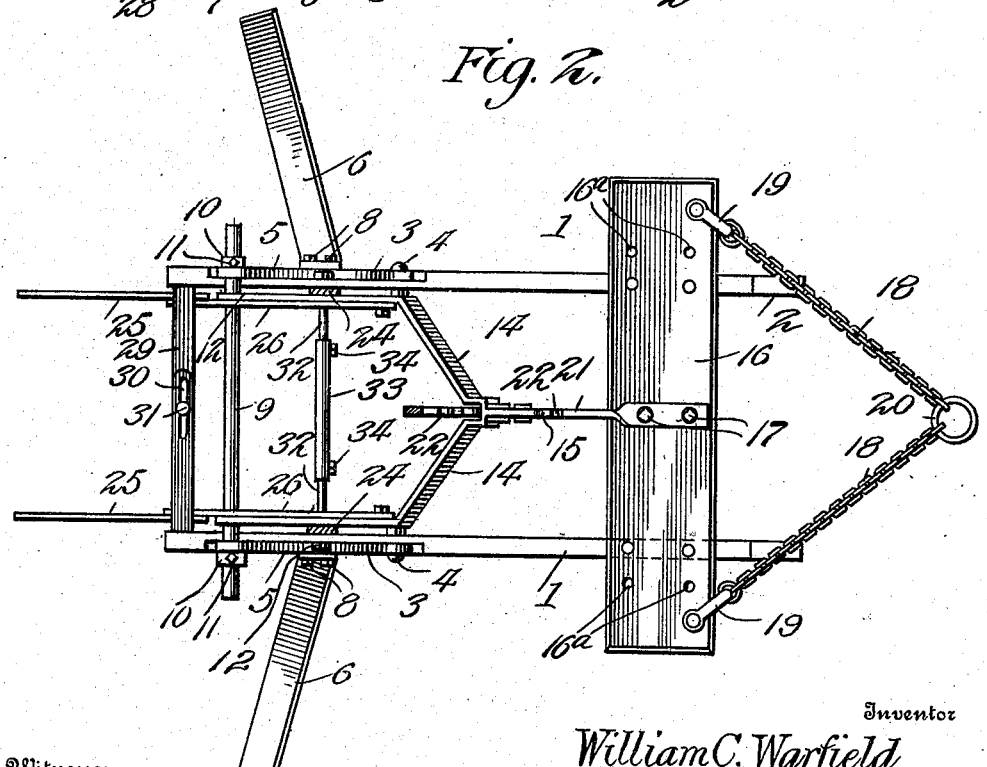

Figure 1 is a side elevation of a weeder and cultivator made in accordance with my invention. Fig. 2 is a plan view of the same.

Referring to the drawing for a more specific description of my invention, the numerals 1 designate a pair of runners provided with metal shoes 2. These runners are each provided with a substantially semi-circular recess 3 upon their outer sides near their rear ends. Pivoted at 4 in the recesses 3 are curved levers 5 and connected to these levers are outwardly and backwardly extending cutting blades 6, said blades at their inner ends being provided with vertical lugs 7 connected by bolts 8 to the curved levers 5. The upper ends of the curved levers 5 are connected by means of a cross rod 9, said cross rod having stop collars 10 thereon through each of which a set screw 11 passes, said set screw engaging the rod 9 to hold the curved levers 5 at properly adjusted position.

Connected to the rod 9 inside the runners 1 are the rear ends 12 of a lever frame having curved portions 13 pivoted at 14 to the runners 1, said lever frame having forwardly and inwardly extending members 14 to which a lever 15 is connected. A cross bar or board 16 is secured by bolts 17 to the runners 1, said board or cross bar having draft chains 18 connected thereto by means of clevises 19 and said draft chains being united in front by a ring 20.

Connected centrally to the cross bar or board 16 is a curved rack bar 21, said rack bar having a series of notches 22 therein in which the pawl 23 is engaged to adjust the blades 6 vertically, as will be hereinafter set forth. A seat 23 is supported upon vertical standards 24 bolted to the runners 1. A pair of shields 25 are connected at their front ends to connecting rods 26, which extend upwardly and are connected at 27 to the lever frame 14, the rear ends of said connecting rods being attached by rivets or other suitable fastenings 28 to the shields 25, as shown in Fig. 1. A pair of arched bars 29 secured to the rear ends of the runners 1 are provided at their inner ends with slots 30 and an adjusted bolt 31. Rods 32 extend inwardly from the runners 1, said rods being connected at their inner ends by a tube 33 provided with set screws 34. The cross bar or board 16 is provided with a series of perforations 16ª by means of which the runners may be adjusted apart at their front ends while at their rear ends the arched bars 29 are adjustable and the rods 32 and tube 33 permit lateral adjustment at the rear ends of said runner. A perforation 35 in the runners 1 permit the curved levers 5 to be adjusted while perforations 36 in said runner permit the adjustment of the rods 32 forming a fulcrum for the operating lever. The curved levers being set in recesses in the sides of the runners are thus out of the way of the weeds and stalks as the machine is drawn over the field. The curved levers are desirable for the reason that they may be readily connected at their upper ends by the cross bar 9.

From the foregoing it will be obvious that my weeder and cultivator is provided with laterally adjustable runners and that the knives and shields may be raised and lowered whenever required.

My invention is of simple construction and is strong, durable and efficient for its purpose.

Having thus described the invention, what is claimed as new, is:—

In a weeder and cultivator of the character described, runners, means for adjusting said runners toward and from each other, curved levers pivoted in recesses in the sides of the runners, cutters carried by said curved levers, an operating lever for raising and lowering said curved levers and cutters, shields, and connecting rods attached to said shields and connected to said operating lever, whereby said shields are simultaneously raised with the cutters, substantially as described.

In testimony whereof I affix my signature in presence of two witnesses.

WILLIAM C. WARFIELD.

Witnesses:
G. M. SMITH,
H. D. COLLINS.